(12) United States Patent
Binek et al.

(10) Patent No.: US 11,614,002 B2
(45) Date of Patent: Mar. 28, 2023

(54) SPLIT CASE STRUCTURE FOR A GAS TURBINE ENGINE

(71) Applicant: Raytheon Technologies Corporation, Farmington, CT (US)

(72) Inventors: Lawrence A. Binek, Glastonbury, CT (US); Randolph T. Lyda, Tequesta, FL (US)

(73) Assignee: Raytheon Technologies Corporation, Farmington, CT (US)

( * ) Notice: Subject to any disclaimer, the term of this patent is extended or adjusted under 35 U.S.C. 154(b) by 0 days.

(21) Appl. No.: 17/085,494

(22) Filed: Oct. 30, 2020

(65) Prior Publication Data

US 2022/0136409 A1 May 5, 2022

(51) Int. Cl.
  *B22D 19/00* (2006.01)
  *B23P 15/00* (2006.01)
  *F01D 25/26* (2006.01)

(52) U.S. Cl.
  CPC ......... *F01D 25/265* (2013.01); *B22D 19/009* (2013.01); *B23P 15/006* (2013.01); *B23P 15/008* (2013.01); *B23P 2700/13* (2013.01); *F05D 2240/14* (2013.01)

(58) Field of Classification Search
  CPC ... B23P 15/008; B23P 15/006; B23P 2700/13; B23P 2700/04; B23P 6/002; F05D 2230/50; F05D 2230/53; B22D 19/009
  See application file for complete search history.

(56) References Cited

U.S. PATENT DOCUMENTS

| 6,345,441 | B1 * | 2/2002 | Farmer | F23R 3/002 |
| | | | | 29/402.13 |
| 6,502,480 | B1 * | 1/2003 | Walker | B21K 1/766 |
| | | | | 74/579 E |
| 2013/0000324 | A1 | 1/2013 | Alvanos | |
| 2014/0035240 | A1 | 2/2014 | Shaik | |
| 2017/0089264 | A1 | 3/2017 | Jones | |
| 2020/0109663 | A1 | 4/2020 | Binek | |
| 2020/0123919 | A1 | 4/2020 | Hall | |

FOREIGN PATENT DOCUMENTS

EP 3712380 A1 9/2020

OTHER PUBLICATIONS

EP search report for EP21205603.0 dated Apr. 5, 2022.

* cited by examiner

*Primary Examiner* — Christopher J Besler
(74) *Attorney, Agent, or Firm* — Getz Balich LLC (57) ABSTRACT

An assembly is provided for a gas turbine engine. This gas turbine engine assembly includes a split case structure. The split case structure includes a first wall, a second wall, a first case segment and a second case segment. The first wall extends axially along and circumferentially about an axial centerline. The second wall extends axially along and circumferentially about the axial centerline. The second wall is radially outboard of and axially overlaps the first wall. The first case segment is configured to form a first portion of the first wall and a first portion of the second wall. The second case segment is configured to form a second portion of the first wall and a second portion of the second wall. The second case segment is circumferentially adjacent and attached to the first case segment at a joint.

19 Claims, 9 Drawing Sheets

SPLIT CASE STRUCTURE FOR A GAS TURBINE ENGINE

BACKGROUND OF THE DISCLOSURE

1. Technical Field

This disclosure relates generally to a gas turbine engine and, more particularly, to a case structure for the gas turbine engine.

2. Background Information

A gas turbine engine includes a static engine structure for housing and/or supporting internal rotating components of the gas turbine engine. A typical static engine structure includes a plurality of tubular axial case segments. These tubular axial case segments are arranged sequentially along an axial centerline of the gas turbine engine and axially connected together by flange connections. While such a static engine structure has various benefits, there is still room in the art for improvement. There is a need in the art therefore for an improved static engine structure as well as methods for manufacturing and assembling static engine structure components.

SUMMARY OF THE DISCLOSURE

According to an aspect of the present disclosure, an assembly is provided for a gas turbine engine. This gas turbine engine assembly includes a split case structure. The split case structure includes a first wall, a second wall, a first case segment and a second case segment. The first wall extends axially along and circumferentially about an axial centerline. The second wall extends axially along and circumferentially about the axial centerline. The second wall is radially outboard of and axially overlaps the first wall. The first case segment is configured to form a first portion of the first wall and a first portion of the second wall. The second case segment is configured to form a second portion of the first wall and a second portion of the second wall. The second case segment is circumferentially adjacent and attached to the first case segment at a joint.

According to another aspect of the present disclosure, another assembly is provided for a gas turbine engine. This gas turbine engine assembly includes a split case structure for the gas turbine engine. The split case structure includes a compressor wall, a combustor wall, a turbine wall, a first case segment and a second case segment. The first case segment is configured to form a first portion of the compressor wall, a first portion of the combustor wall and a first portion of the turbine wall. The second case segment is configured to form a second portion of the compressor wall, a second portion of the combustor wall and a second portion of the turbine wall.

According to still another aspect of the present disclosure, a manufacturing method is provided. During this method, a split case structure preform is formed that includes a first case segment preform and a second case segment preform. The first case segment preform is formed integral with the second case segment preform as a monolithic body. The first case segment preform is separated from the second case segment preform to respectively provide a first case segment and a second case segment that is discrete from the first case segment. The first case segment is configured to be arranged adjacent and mechanically fastened to the second case segment to form a split case structure for a gas turbine engine.

The first case segment preform may be indirectly connected to the second case segment preform through one or more intermediate bridge structures.

The first case segment preform may be directly connected to the second case segment preform.

The forming of the split case structure preform may include additively manufacturing the split case structure preform within a build space of an additive manufacturing system.

The manufacturing method may also include mechanically attaching the first case segment to the second case segment to form the split case structure. The split case structure may include: a compressor section wall, a combustor section wall and/or a turbine section wall.

The first case segment may be configured as a monolithic body. The second case segment may also or alternatively be configured as a monolithic body.

One of the first wall and the second wall may be configured as or otherwise include a diffuser wall.

One of the first wall and the second wall may be configured as or otherwise include a combustor wall.

One of the first wall and the second wall may be configured as or otherwise include a compressor wall.

One of the first wall and the second wall may be configured as or otherwise include a turbine wall.

The first case segment may include a support member that extends between and connects the first wall to the second wall.

The first case segment may include a channel. The second case segment may include a seal element inserted within the channel to seal an interface between the first case segment and the second case segment at the joint.

The split case structure may also include a seal element arranged between and engaged with the first case segment and the second case segment to seal an interface between the first case segment and the second case segment at the joint.

The first case segment may include a crush seal element configured to engage the second case segment to seal an interface between the first case segment and the second case segment at the joint.

The split case structure may form a compressor section inlet and a turbine section outlet. The first case segment may extend axially along the axial centerline from the compressor section inlet to the turbine section outlet. The second case segment may also or alternatively extend axially along the axial centerline from the compressor section inlet to the turbine section outlet.

The second case segment may be circumferentially adjacent and attached to the first segment at an axially extending joint.

The first case segment may form a respective portion of an inlet to a compressor section of the gas turbine engine. The first case segment may also or alternatively form a respective portion of an outlet from a turbine section of the gas turbine engine.

The second case segment may form a respective portion of an/the inlet to a/the compressor section of the gas turbine engine. The second case segment may also or alternatively form a respective portion of an/the outlet from a/the turbine section of the gas turbine engine.

The split case structure may include a first wall and a second wall radially outboard of and axially overlapping the first wall. The first case segment may be configured to form a first portion of the first wall and a first portion of the second wall. The second case segment may be configured to form a second portion of the first wall and a second portion of the second wall.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
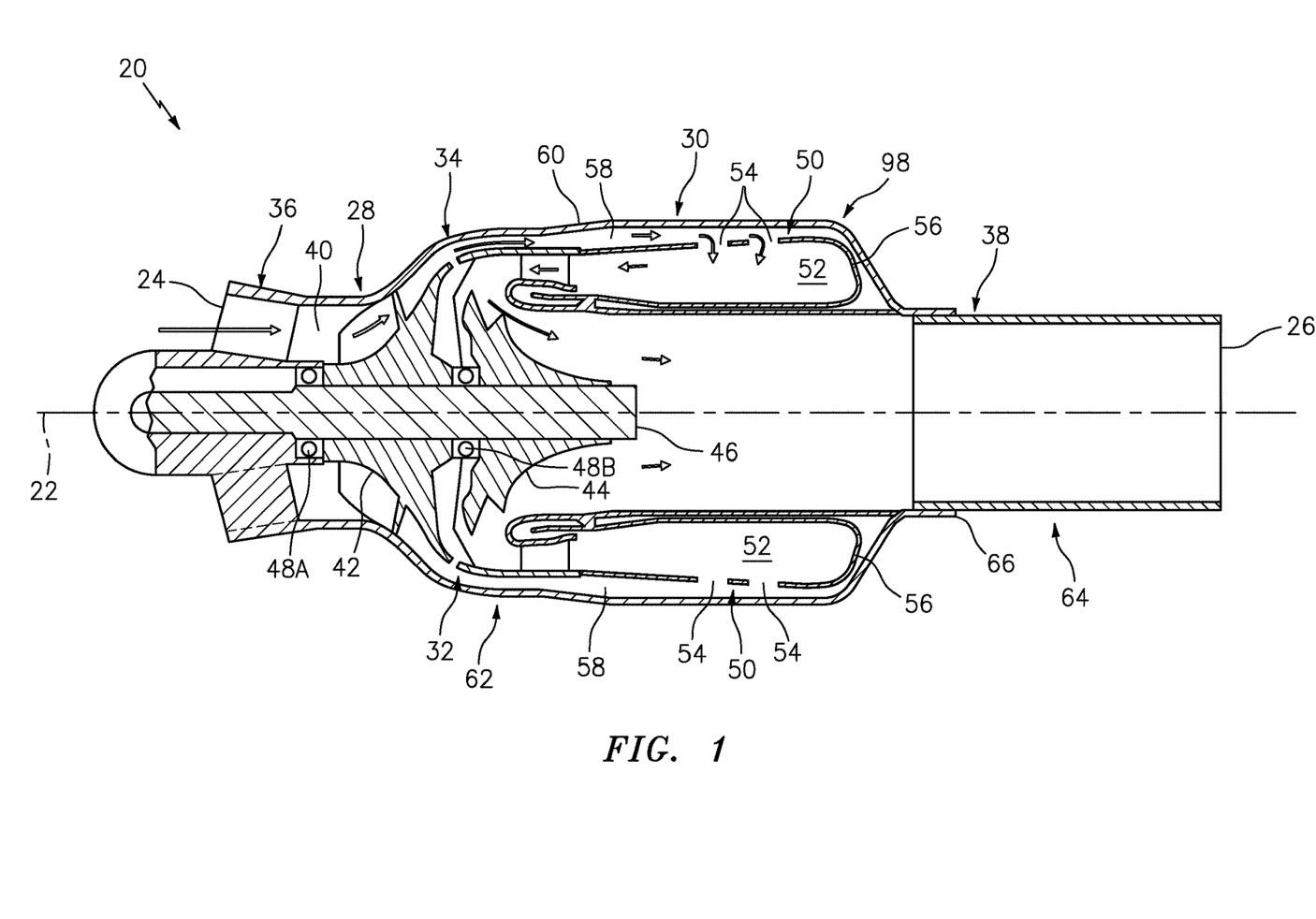
FIG. 1 is a side sectional schematic illustration of a gas turbine engine.

FIG. 1 is a side sectional illustration of a gas turbine engine 20. The gas turbine engine 20 of FIG. 1 is configured as a single spool, radial-flow turbojet turbine engine. This gas turbine engine 20 is configured for propelling an aircraft such as, but not limited to, an unmanned aerial vehicle (UAV), a drone or any other manned or unmanned aircraft or self-propelled projectile. The present disclosure, however, is not limited to such an exemplary turbojet turbine engine configuration nor to an aircraft propulsion system application. For example, the gas turbine engine 20 may alternatively be configured as an auxiliary power unit (APU) or an industrial gas turbine engine.

The gas turbine engine 20 of FIG. 1 extends axially along an axial centerline 22 between a forward, upstream airflow inlet 24 and an aft, downstream airflow exhaust 26. This axial centerline 22 may also be a rotational axis for various components within the gas turbine engine 20.

The gas turbine engine 20 includes a compressor section 28, a combustor section 30 and a turbine section 32. The gas turbine engine 20 also includes a static engine structure 34. This static engine structure 34 houses the compressor section 28, the combustor section 30 and the turbine section 32. The static engine structure 34 of FIG. 1 also forms an inlet section 36 and an exhaust section 38 for the gas turbine engine 20, where the inlet section 36 forms the airflow inlet 24 and the exhaust section 38 forms the airflow exhaust 26.

The engine sections 36, 28, 30, 32 and 38 are arranged sequentially along a core flowpath 40 that extends through the gas turbine engine 20 from the airflow inlet 24 to the airflow exhaust 26. Each of the engine sections 28 and 32 includes a respective rotor 42 and 44. Each of these rotors 42, 44 includes a plurality of rotor blades arranged circumferentially around and connected to at least one respective rotor disk. The rotor blades, for example, may be formed integral with or mechanically fastened, welded, brazed, adhered and/or otherwise attached to the respective rotor disk(s).

The compressor rotor 42 may be configured as a radial flow rotor. The turbine rotor 44 may also or alternatively be configured as a radial flow rotor. The compressor rotor 42 is connected to the turbine rotor 44 through a shaft 46. This shaft 46 is rotatably supported by the static engine structure 34 through a plurality of bearings 48A and 48B (generally referred to as 48); e.g., rolling element bearings, journal bearings, etc.

The combustor section 30 includes an annular combustor 50 with an annular combustion chamber 52. The combustor 50 of FIG. 1 is configured as a reverse flow combustor. Inlets ports/flow tubes 54 into the combustion chamber 52, for example, may be arranged at (e.g., on, adjacent or proximate) and/or towards an aft bulkhead wall 56 of the combustor 50. An outlet from the combustor 50 may be arranged axially aft of an inlet to the turbine section 32. The combustor 50 may also be arranged radially outboard of and/or axially overlap at least a (e.g., aft) portion of the turbine section 32. With this arrangement, the core flowpath 40 of FIG. 1 reverses its directions (e.g., from a forward-to-aft direction to an aft-to-forward direction) a first time as the flowpath 40 extends from a diffuser plenum 58 surrounding the combustor 50 into the combustion chamber 52. The core flowpath 40 of FIG. 1 then reverses its direction (e.g., from the aft-to-forward direction to the forward-to-aft direction) a second time as the flowpath 40 extends from the combustion chamber 52 into the turbine section 32.

During operation, air enters the gas turbine engine 20 through the inlet section 36 and its airflow inlet 24. The inlet section 36 directs this air from the airflow inlet 24 into the core flowpath 40 and the compressor section 28. The airflow inlet 24 of FIG. 1 thereby forms a forward, upstream inlet to the core flowpath 40 and the compressor section 28. The air within the core flowpath 40 may be referred to as core air.

The core air is compressed by the compressor rotor 42 and directed through a diffuser 60 and its plenum 58 into the combustion chamber 52. Fuel is injected and mixed with the compressed core air to provide a fuel-air mixture. This fuel-air mixture is ignited within the combustion chamber 52, and combustion products thereof flow through the turbine section 32 and cause the turbine rotor 44 to rotate. This rotation of the turbine rotor 44 drives rotation of the compressor rotor 42 and, thus, compression of the air received from the airflow inlet 24. The exhaust section 38 receives the combustion products from the turbine section 32. The exhaust section 38 directs the received combustion products out of the gas turbine engine 20 to provide forward engine thrust.

The static engine structure 34 of FIG. 1 may include some or all static engine components included in the gas turbine engine 20. Herein, the term static may describe a component that does not rotate with the rotating assembly (e.g., an assembly of the rotors 42 and 44 and the shaft 46) during gas turbine engine operation. A static component, for example, may refer to any component that remains stationary during gas turbine engine operation such as, but not limited to, a wall, a liner, a strut, a fixed vane, a fuel nozzle, a conduit, etc. The static engine structure 34 of FIG. 1, for example, includes a forward, split case structure 62 and an aft, exhaust duct structure 64.

Figure 2:
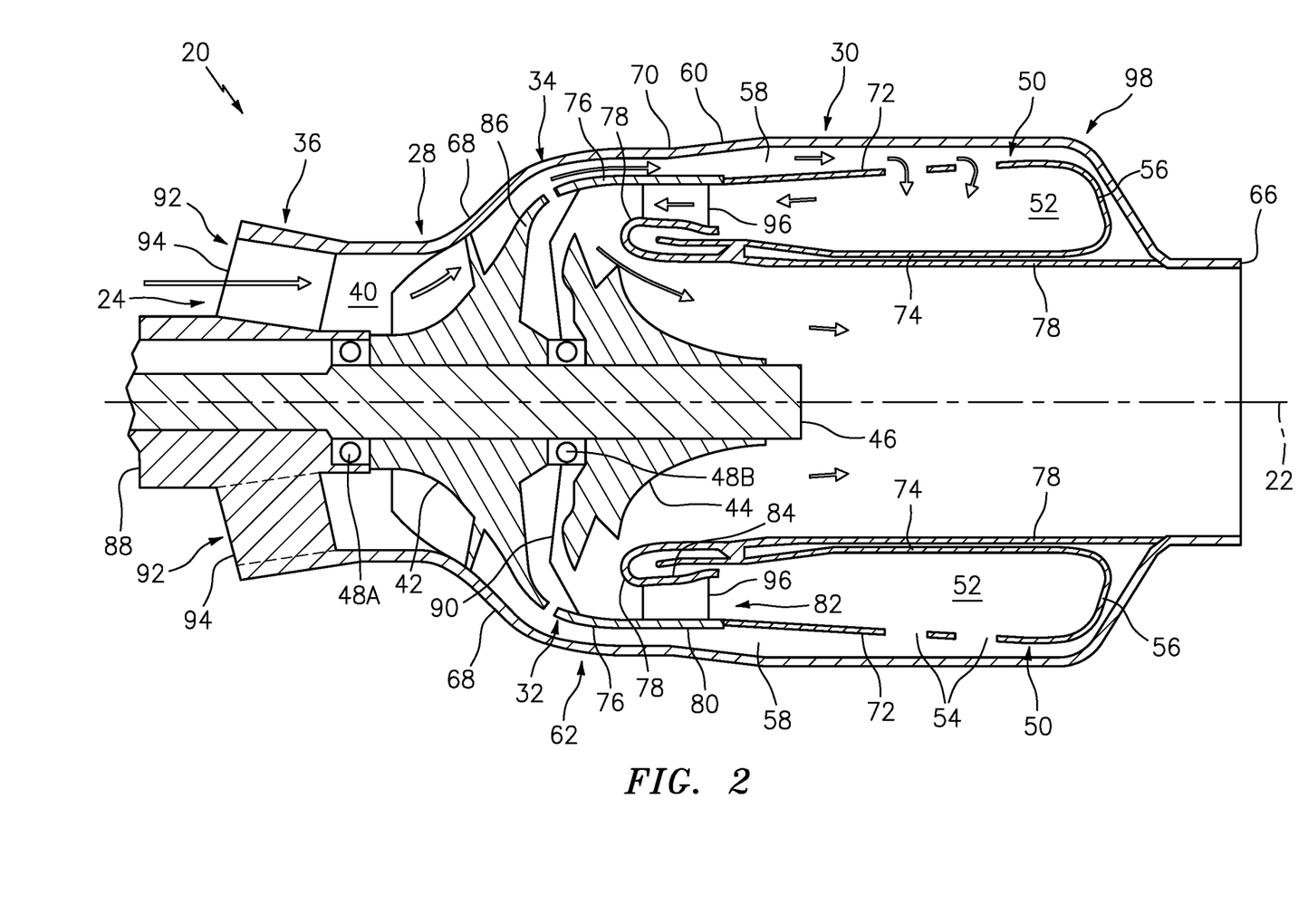
FIG. 2 is a side sectional schematic illustration of a portion of the gas turbine engine.

The split case structure 62 of FIG. 2 is configured as a generally tubular structure. The split case structure 62, example, extends axially along the axial centerline 22 from the forward airflow inlet 24 to an outlet 66 from the turbine section 32. The split case structure 62 also extends circumferentially about (e.g., completely around) the axial centerline 22 such that the split case structure 62 has, for example, a full hoop geometry; see also FIGS. 3 and 4.

The split case structure 62 includes one or more case walls. The split case structure 62 of FIG. 2, for example, includes a compressor wall 68, a diffuser wall 70, an outer combustor wall 72 of the combustor 50, an inner combustor wall 74 of the combustor 50, the bulkhead wall 56 of the combustor 50, an outer turbine wall 76 and an inner turbine wall 78. One or more or each of these case walls 56, 68, 70, 72, 74, 76 and/or 78 may be generally tubular or generally annular. Each of the case walls 68, 70, 72, 74, 76, 78 of FIG. 2, for example, is tubular, and the bulkhead wall 56 is annular.

The compressor wall 68 extends axially along the axial centerline 22 between and is connected to the inlet section 36 and the diffuser wall 70. The compressor wall 68 of FIG. 2 circumscribes, axially overlaps and thereby houses the compressor rotor 42.

The diffuser wall 70 extends axially along the axial centerline 22 between and is connected to the compressor wall 68 and an aft end portion of the inner turbine wall 78. The diffuser wall 70 is spaced/displaced radially outboard from and axially overlaps the combustor 50. The diffuser wall 70 of FIG. 2 thereby forms an outer peripheral boundary of the diffuser plenum 58 that surrounds the combustor 50.

The outer combustor wall 72 extends axially along the axial centerline 22 between and may be connected to the bulkhead wall 56 and an outer platform 80 of an exit nozzle 82 from the combustion chamber 52. The inner combustor wall 74 is circumscribed and axially overlapped by the outer combustor wall 72. The inner combustor wall 74 extends axially along the axial centerline 22 between and may be connected to the bulkhead wall 56 and an inner platform 84 of the exit nozzle 82. The bulkhead wall 56 extends radially between and is connected to aft end portions of the outer combustor wall 72 and the inner combustor wall 74. The case walls 56, 72 and 74 may thereby collectively form peripheral boundaries of the combustion chamber 52 therebetween.

The outer turbine wall 76 may be connected to the exit nozzle outer platform 80. The outer turbine wall 76 projects axially out from the exit nozzle outer platform 80 and extends axially towards/to an aft, downstream end of an inner platform 86 of the compressor rotor 42. This outer turbine wall 76 is circumscribed and axially overlapped by the diffuser wall 70. The outer turbine wall 76 of FIG. 2 may thereby form an inner peripheral boundary of the core flowpath 40 within the diffuser 60, and may form an outer peripheral boundary of the core flowpath 40 within a (e.g., upstream) portion of the turbine section 32. The outer turbine wall 76 of FIG. 2 also circumscribes, axially overlaps and thereby houses a (e.g., upstream) portion of the turbine rotor 44.

The inner turbine wall 78 may be connected to the exit nozzle inner platform 84. An upstream portion of the inner turbine wall 78 projects axially (in the aft-to-forward direction) out from the exit nozzle inner platform 84 to a turning portion of the inner turbine wall 78. A downstream portion of the inner turbine wall 78 projects axially (in the forward-to-aft direction) away from the inner turbine wall turning portion to the turbine section outlet 66. The inner turbine wall 78 is circumscribed and axially overlapped by the combustor 50. The inner turbine wall 78 is also spaced/displaced radially inboard from the combustor 50. The inner turbine wall 78 of FIG. 2 thereby forms an inner peripheral boundary of the diffuser plenum 58 that surrounds the combustor 50. The inner turbine wall 78 forms an outer peripheral boundary of the core flowpath 40 within a (e.g., downstream) portion of the turbine section 32. The inner turbine wall 78 of FIG. 2 also circumscribes, axially overlaps and thereby houses a (e.g., downstream) portion of the turbine rotor 44.

The static engine structure 34 may also include one or more internal support structures with one or more support members. Examples of support members include, but are not limited to, struts, structural guide vanes, bearing supports, bearing compartment walls, etc. The static engine structure 34 of FIG. 2, for example, includes a forward support structure 88, an aft support structure 90, an inlet nozzle 92 and the exit nozzle 82. The forward support structure 88 and the inlet nozzle 92 may be configured together. The forward support structure 88 may be configured to support the forward bearing 48A. The aft support structure 90 may be configured to support the aft bearing 48B. The inlet nozzle 92 may be configured to condition the core air entering the compressor section 28. The inlet nozzle 92, for example, may include one or more guide vanes 94 which impart swirl to the core air. The exit nozzle 82 may similarly be configured to condition the combustion products exiting the combustor section 30. The exit nozzle 82, for example, may include one or more guide vanes 96 which import swirl to the combustion products, where these guide vanes 96 are connected to and extend radially between the exit nozzle inner and outer platforms 80 and 84. The static engine structure 34, of course, may also or alternative include various other static/stationary gas turbine engine components.

Figure 3:
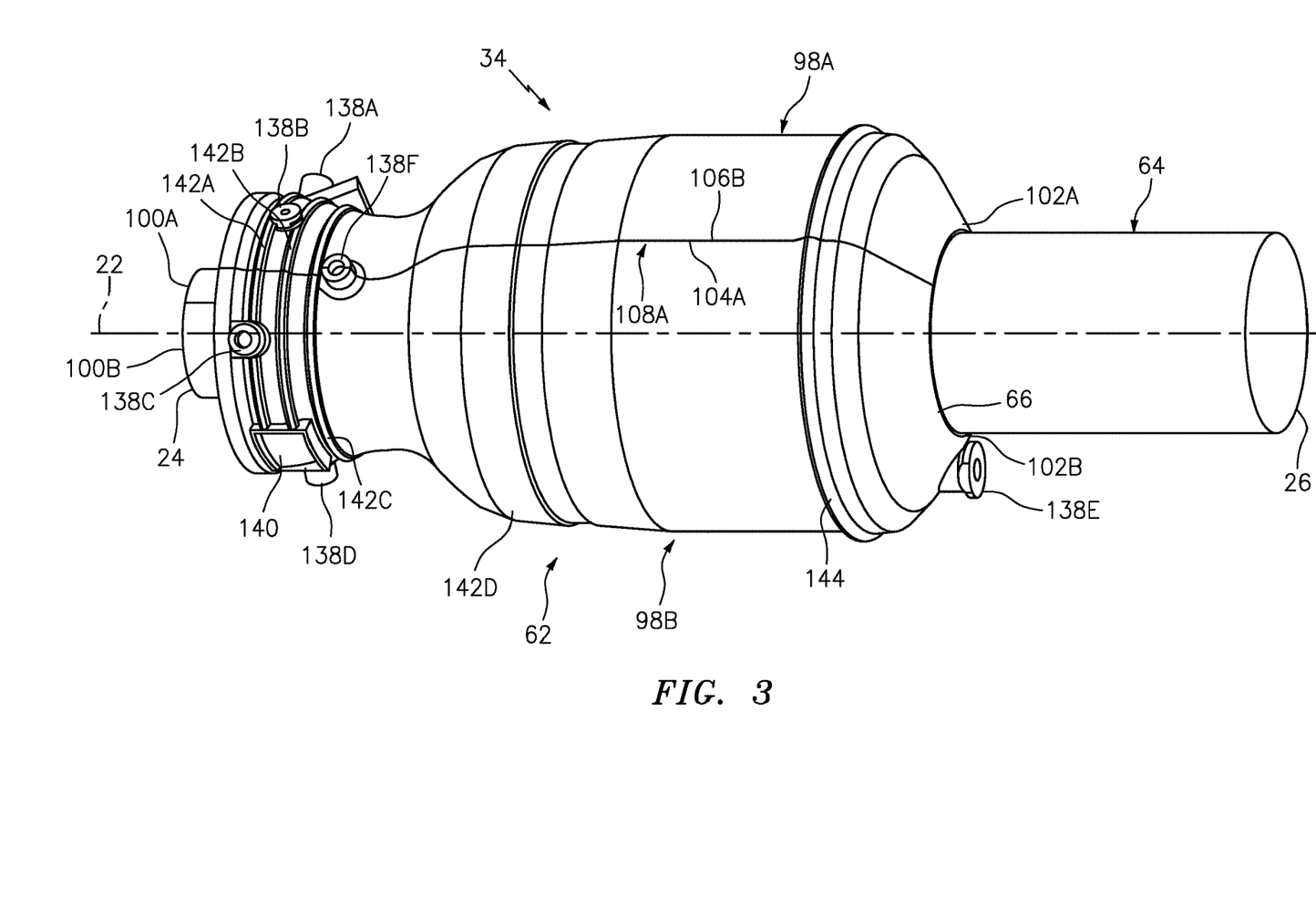
FIG. 3 is a side perspective illustration of a static engine structure for the gas turbine engine.
Figure 4:
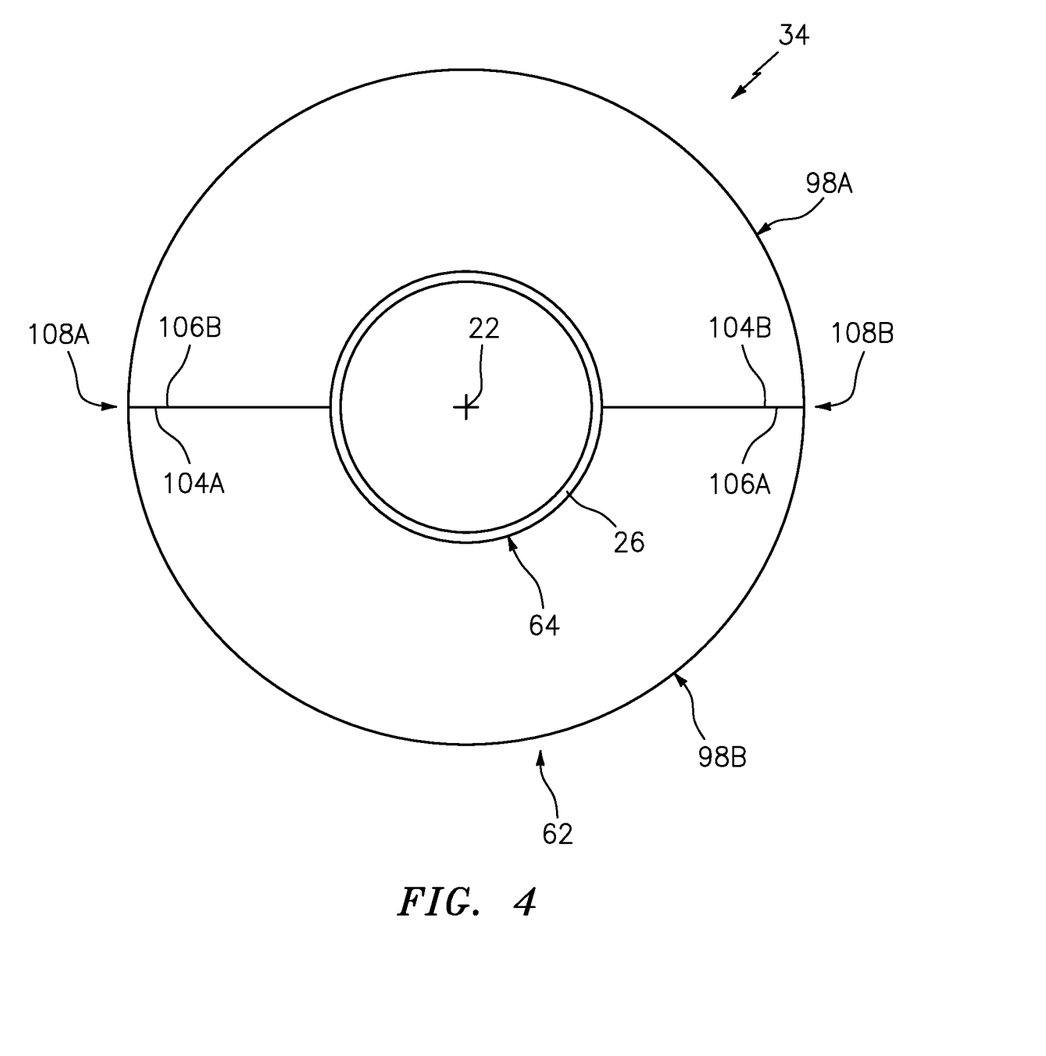
FIG. 4 is an illustration of an aft end of the static engine structure.

Referring now to FIGS. 3 and 4, the split case structure 62 is configured from a plurality of discrete split case segments 98A and 98B (generally referred to as 98); e.g., split case halves. The split case structure 62 of FIGS. 3 and 4, for example, at least or only includes a first case segment 98A (e.g., a first side split case half) and a second case segment 98B (e.g., a second side split case half). Referring to FIG. 3, each of the case segments 98A, 98B extends axially along the axial centerline 22 between a forward end 100A, 100B of the split case structure 62 and an axially opposing aft end 102A, 102B of the split case structure 62, where the forward end 100A, 100B may be at the airflow inlet 24 and/or the aft end 102A, 102B may be at the turbine section outlet 66. Referring to FIG. 4, each of the case segments 98A, 98B extends circumferentially about (e.g., about 180 degrees around) the axial centerline 22 between a first side 104A, 104B of the respective case segment 98A, 98B and a circumferentially opposing second side 106A, 106B of the respective case segment 98A, 98B.

The first side 104A of the first case segment 98A is arranged circumferentially adjacent the second side 106B of the second case segment 98B. The first case segment 98A is connected (e.g., mechanically attached) to the second case segment 98B at an axially extending joint 108A between the first case segment first side 104A and the second case segment second side 106B. Similarly, the second side 106A of the first case segment 98A is arranged circumferentially adjacent the first side 104B of the second case segment 98B. The first case segment 98A is connected (e.g., mechanically attached) to the second case segment 98B at an axially extending joint 108B between the first case segment second side 106A and the second case segment first side 104B.

Therefore, when the case segments 98 are arranged and connected together, the case segments 98 collectively form the split case structure 62.

With the foregoing arrangement, during assembly of the gas turbine engine 20 of FIG. 1, the bearings 48 may be mated with (e.g., mounted to) the shaft 46. The rotating assembly (e.g., 42, 44 and 46) with the bearings 48 may be mated with (e.g., seated in) one of the case segments 98; e.g., the first case segment 98A of FIGS. 3 and 4. The other one of the case segments 98 (e.g., the second case segment 98B of FIGS. 3 and 4) may thereafter be mated with the first case segment 98A to enclose the rotating assembly (e.g., 42, 44 and 46) and the bearings 48 within the split case structure 62.

Since the case structure 62 is configured as a split case structure (e.g., includes the discrete case segments 98 which are, for example, mechanically attached together), the entire rotating structure (e.g., 42, 44 and 46) may be placed laterally into the split case structure 62 as a single unit when the case segments 98 are apart. The rotating structure (e.g., 42, 44 and 46) may therefore be formed as a single monolithic body. The split case structure 62 may extend as a single unit between its opposing ends (e.g., between the inlet 24 and the outlet 66), rather than being pieced together from a plurality of axial case segments as in a prior art gas turbine engine application. The compressor rotor 42 and/or the turbine rotor 44 may be sized greater than a minimum diameter of the split case structure 62. By contrast, when a rotating assembly is slid/axially translated during the mating with a case segment, the maximum diameter of a rotor of the rotating assembly cannot be greater than a minimum diameter of a portion of the case segment where the rotor needs to travel axially into or through the case segment portion. In addition, the split case structure 62 may be additively manufactured (e.g., in a single process) within a build space of an additive manufacturing system as described below in further detail.

Referring to FIG. 2, each of the case segments 98A, 98B may be configured to at least partially form any one or more or each of the case walls 56, 68, 70, 72, 74, 76 and 78 and/or any one or more or each of the support structures 82, 88, 90 and 92. Each case segment 98 of FIG. 2, for example, is configured to form a respective portion (e.g., half) of the compressor wall 68, a respective portion (e.g., half) of the diffuser wall 70, a respective portion (e.g., half) of the outer combustor wall 72, a respective portion (e.g., half) of the inner combustor wall 74, a respective portion (e.g., half) of the bulkhead wall 56, a respective portion (e.g., half) of the outer turbine wall 76, and a respective portion (e.g., half) of the inner turbine wall 78. Each case segment 98 of FIG. 2 is also configured to form a respective portion (e.g., half) of the forward support structure 88, a respective portion (e.g., half) of the aft support structure 90, a respective portion (e.g., half) of the inlet nozzle 92, and a respective portion (e.g., half) of the exit nozzle 82. Thus, each of the case segments 98 may form each part of the split case structure 62 in a corresponding portion (e.g., half) of the split case structure 62. Each case segment 98 may thereby form a static portion of one or more or each of the engine sections 28, 30, 32, 36 and 38 (see FIG. 1).

Each of the case segments 98 may be formed as a monolithic body. Herein, the term monolithic may described an apparatus which is formed as a single unitary body. Each case segment 98, for example, may be additively manufactured, cast, machined and/or otherwise formed as an integral, unitary body. By contrast, a non-monolithic body may include parts that are discretely formed from one another, where those parts are subsequently mechanically fastened and/or otherwise attached to one another.

Referring to FIGS. 5-8, the first case segment 98A may be sealingly engaged with and/or otherwise mated with the second case segment 98B at one or each of the joints 108A and 108B (generally referred to as 108); see also FIG. 4. A first wall portion 110A (e.g., any one of the wall 56, 68, 70, 72, 74, 76, 78 portions in FIG. 2) of one of the case segments 98 (e.g., the first case segment 98A or the second case segment 98B), for example, may be sealingly engaged with a respective second wall portion 110B (e.g., any one of the wall 56, 68, 70, 72, 74, 76, 78 portions in FIG. 2) of another one of the case segments 98 (e.g., the second case segment 98B or the first case segment 98A) at the respective joint 108. Various types of sealed joints/interfaces are shown in FIGS. 5-8. The present disclosure, however, is not limited to any of these exemplary sealed joints/interfaces. Furthermore, it is contemplated that the seal joint between portions of one wall may be the same or different than the seal joint between portions of another one or more of the walls of the same split case structure 62.

Figure 5:
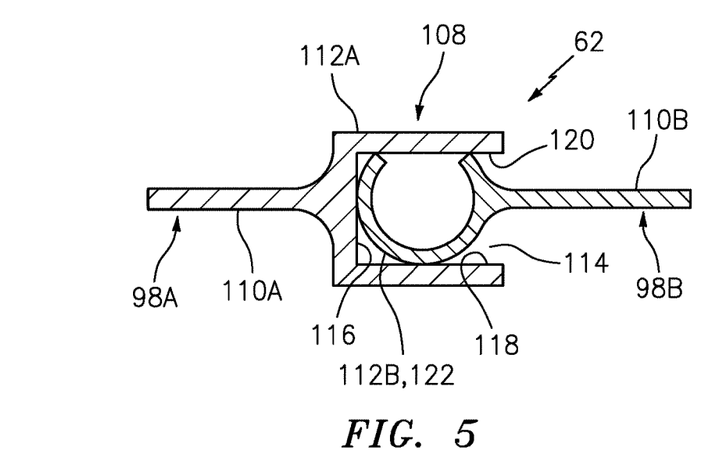
FIGS. 5-8 are sectional illustrations of various sealed joints between a first wall portion and a second wall portion.

Referring to FIG. 5, in some embodiments, the first wall portion 110A includes a (e.g., female) first mounting coupler 112A configured with an axially extending channel 114. This channel 114 extends laterally (e.g., circumferentially or tangentially) into the first wall portion 110A from a respective side to a blind end formed by a channel end surface 116. The channel 114 extends radially within the first wall portion 110A between opposing channel side surfaces 118 and 120. The second wall portion 110B includes a (e.g., male) second mounting coupler 112B configured with a seal element 122. Examples of the seal element 122 may include, but are not limited to, a C-seal element, a U-seal element, a V-seal element and a W-seal element. The seal element 122 is configured to be inserted within/project into the channel 114 and sealing engage the first mounting coupler 112A. For example, when the case segments 98A and 98B are mated, the mounting couplers 112A and 112B may be pushed laterally together such that the seal element 122 is pushed and/or compressed within the channel 114 and against any one or more or each of the channel surfaces 116, 118 and/or 120. The mounting couplers 112A and 112B may thereby seal an interface between the first wall portion 110A and the second wall portion 110B at the respective joint 108.

Figure 6:
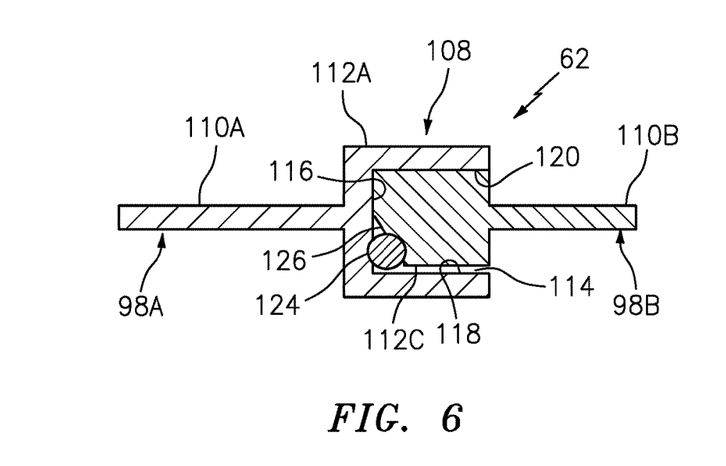

Referring to FIG. 6, in some embodiments, the split case structure 62 further includes at least one seal element 124, which seal element 124 may be discrete from or attached to one of the wall portions 110A and 110B. Examples of the seal element 124 may include, but are not limited to, a rope seal and a crushable seal. Other examples of the seal element 124 may include, but are still not limited to, a C-seal element, a U-seal element, a V-seal element and a W-seal element. The first wall portion 110A includes the (e.g., female) first mounting coupler 112A. The second wall portion 110B includes a (e.g., male) second mounting coupler 112C. The second mounting coupler 112C is configured to be inserted within/project into the channel 114 and sealing engage the first mounting coupler 112A through at least the seal element 124. The sealing element 124, for example, may be arranged between and pressed, compressed and/or crushed against one or more of the channel surfaces (e.g., the surfaces 116 and 118) and a chamfered end surface 126 of the second mounting coupler 112C. The mounting couplers 112A and 112C and the seal element 124 may thereby seal the interface between the first wall portion 110A and the second wall portion 110B at the respective joint 108.

Figure 7:
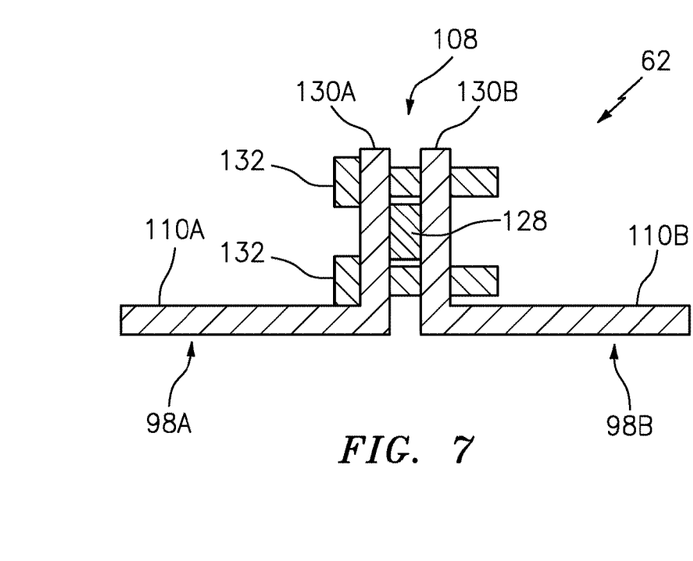

Referring to FIG. 7, in some embodiments, the split case structure 62 further includes at least one seal element 128, which seal element 128 may be discrete from or attached to one of the wall portions 110A and 110B. An example of the seal element 128 is, but is not limited to, a flat face seal gasket. Such a flat face seal gasket may be constructed from material such as, but not limited to, Grafoil® material (produced by Neograf Solutions, LLC in Ohio, United States) for high temperature applications. The present disclosure, however, is not limited to the foregoing exemplary seal material. The first wall portion 110A includes a first mounting flange 130A and the second wall portion 110B includes a second mounting flange 130B. The seal element 128 is arranged (e.g., sandwiched) between the mounting flanges 130A and 130B, and the mounting flanges 130A and 130B are mechanically fastened together by one or more fasteners 132; e.g., bolts, studs, etc. The flanges 130A and 130B and the seal element 128 may thereby seal the interface between the first wall portion 110A and the second wall portion 110B at the respective joint 108.

Figure 8:
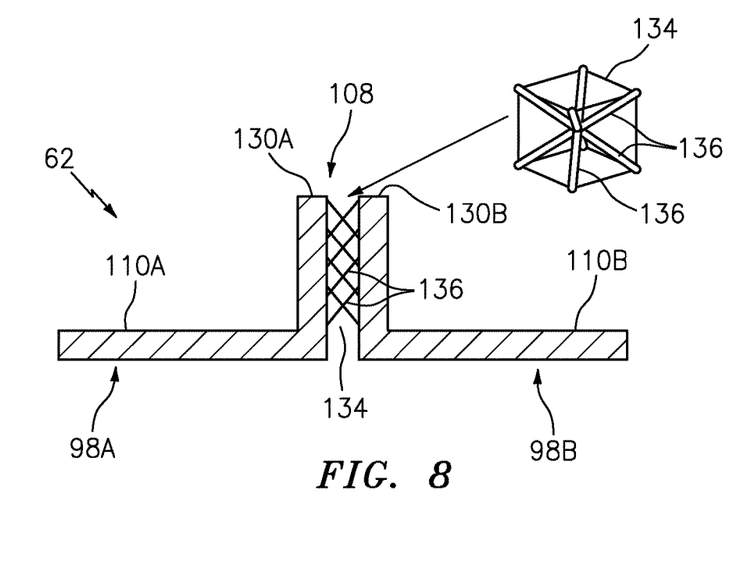

Referring to FIG. 8, in some embodiments, the split case structure 62 further includes at least one seal element 134, which seal element 134 may be discrete from or attached to or formed integral with one of the wall portions 110A and 110B. This seal element 134 may be a deformable (e.g., crushable) seal element. The seal element 134 of FIG. 8, for example, is configured from a network (e.g., a truss system and/or lattice) of webs 136. These webs 136 are arranged such that the seal element 134 may be laterally (e.g., circumferentially and/or tangentially) compressed/crushed. The interstices (e.g., apertures) between the webs 136 may also or alternatively provide a scaffold for a bonding adhesive and/or a ceramic compound (e.g., thermal isolating material). Alternatively, at least some or all of the interstices may be empty. The first wall portion 110A includes the first mounting flange 130A and the second wall portion 110B includes the second mounting flange 130B. The seal element 134 is arranged (e.g., sandwiched) between the mounting flanges 130A and 130B, and the mounting flanges 130A and 130B are mechanically fastened together by one or more fasteners (e.g., see fasteners 132 in FIG. 7). The flanges 130A and 130B and the seal element 134 may thereby seal the interface between the first wall portion 110A and the second wall portion 110B at the respective joint 108.

Figure 9:
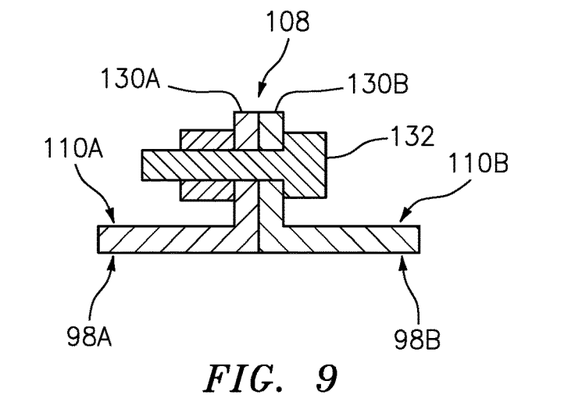
FIG. 9 is a sectional illustration of a mechanical connection between a first case segment and a second case segment.

Referring to FIG. 9, one or more respective sets of wall portions 110A and 110B (e.g., of the exterior walls 68, 70 and, for example, an aft portion of 78) may be mechanically attached to one another at each joint 108. The wall portions 110A and 110B of FIG. 9, for example, are attached together by a bolted flange connection. However, one or more other wall portions 110A and 110B (e.g., of the interior walls 56, 72, 74, 76 and, for example, a forward portion of 78) may be joined without fasteners (e.g., see FIGS. 5 and 6); e.g., by sealed slip joints, sealed male-female (e.g., tongue and groove) joints, etc.

Referring again to FIG. 1, the exhaust duct structure 64 is configured as a tubular body that extends axially along and circumferentially about (e.g., completely around) the axial centerline 22. A forward, upstream end portion of the exhaust duct structure 64 is nested within and mounted with the inner turbine wall 78 at the turbine section outlet 66. An aft, downstream portion of the exhaust duct structure 64 forms the airflow exhaust 26. This exhaust duct structure 64 may be formed as a single tubular monolithic body; however, the present disclosure is not limited to such an exemplary configuration.

In some embodiments, referring to FIG. 3, one or more of the case segments 98 may include one or more additional features. Examples of these additional features include, but are not limited to, bosses 138A-F, mount 140, reinforcements 142A-D (e.g., ribs, stiffeners, etc.), and fluid passage 144 (e.g., conduit). In general, the additional features are configured to avoid or minimize overlapping/crossing the joints 108 between the case segments 98. For example, any one or more or all of the features may be completely configured with a single one of the case segments; e.g., 98A or 98B. However, in some embodiments, one or more of the additional features (e.g., the boss 138F, the reinforcements 142A-D, the conduit 144) may extend across at least one of the joints 108 between the case segments 98.

Figure 10:
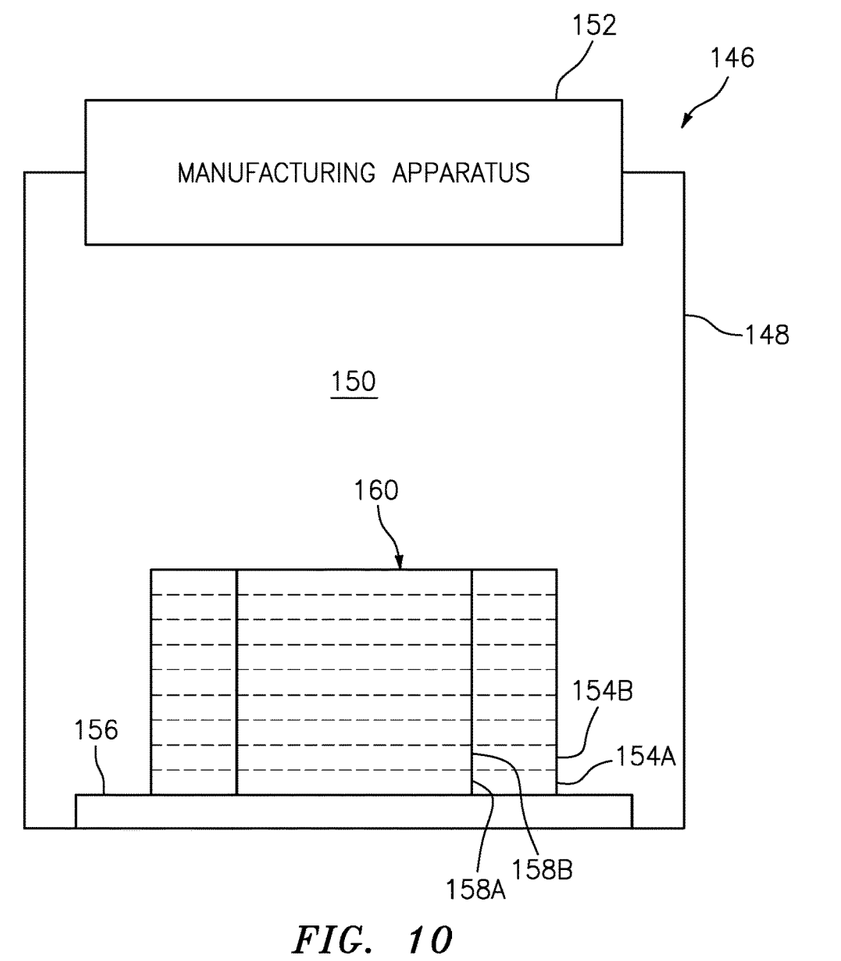
FIG. 10 is a schematic illustration of a manufacturing system.

FIG. 10 illustrates a system 146 for manufacturing a static engine structure such as, but not limited to, the static engine structure 34 of FIG. 1. This manufacturing system 146 (e.g., an additive manufacturing system) includes a build chamber 148 defining a build space 150 for manufacturing the static engine structure 34 (or one or more of its components). The manufacturing system 146 also includes an additive manufacturing apparatus 152; e.g., a laser powder bed fusion (LPBF) apparatus.

The additive manufacturing apparatus 152 is configured to build the static engine structure 34 (or one or more of its components) or a preform thereof within the build space 150 in a layer-by-layer fashion. For example, the additive manufacturing apparatus 152 may deposit a first layer of powder 154A over a support surface 156 within the build space 150. The additive manufacturing apparatus 152 may thereafter selectively solidify (e.g., sinter) a select portion of the first layer of powder 154A to form a first portion 158A (e.g., layer, slice) of the static engine structure 34 (or one or more of its components) or a preform thereof. The additive manufacturing apparatus 152 may deposit a second layer of powder 154B within the build space 150 over the first layer of at least partially solidified powder 154A. The additive manufacturing apparatus 152 may thereafter selectively solidify a select portion of the second layer of powder 154B with the previously solidified first portion 158A to form a second portion 158B (e.g., layer, slice) of the static engine structure 34 (or one or more of its components) or a preform thereof. This process may be repeated until the entire static engine structure 34 (or one or more of its components) or a preform thereof is formed.

While the additive manufacturing apparatus 152 is described above as a laser powder bed fusion (LPBF) apparatus, the present disclosure is not limited thereto. The additive manufacturing apparatus 152, for example, may alternatively be configured as a stereolithography (SLA) apparatus, a direct selective laser sintering (DSLS) apparatus, an electron beam sintering (EBS) apparatus, an electron beam melting (EBM) apparatus, a laser engineered net shaping (LENS) apparatus, a laser net shape manufacturing (LNSM) apparatus, a direct metal deposition (DMD) apparatus or a direct metal laser sintering (DMLS) apparatus.

Figure 11:
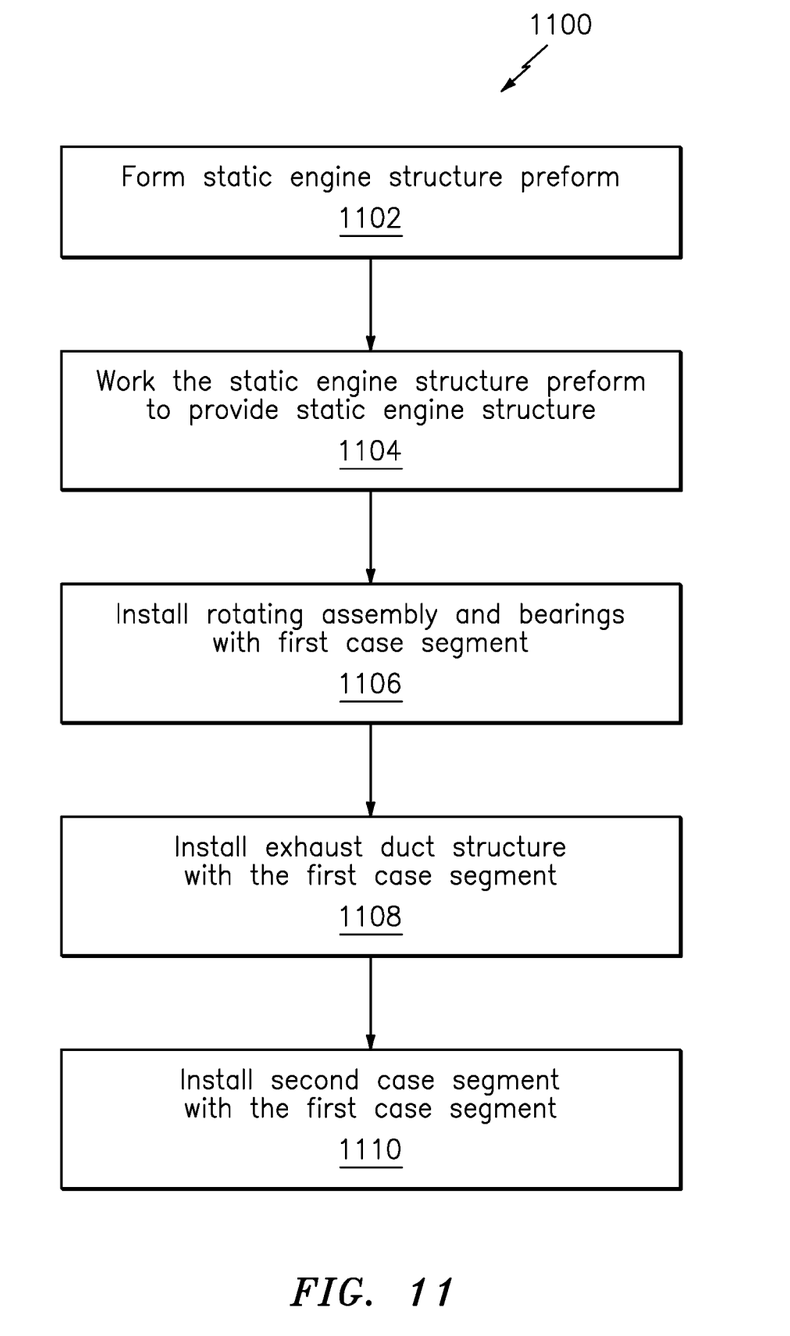
FIG. 11 is a flow diagram of a method for forming a gas turbine engine.

FIG. 11 is a flow diagram of a method 1100 for manufacturing an engine such as, but not limited to, the gas turbine engine 20 (or one or more of its components) of FIG. 1. This method 1100 may be performed using a manufacturing system such as, but not limited to, the manufacturing system 146 of FIG. 10.

Figure 12:
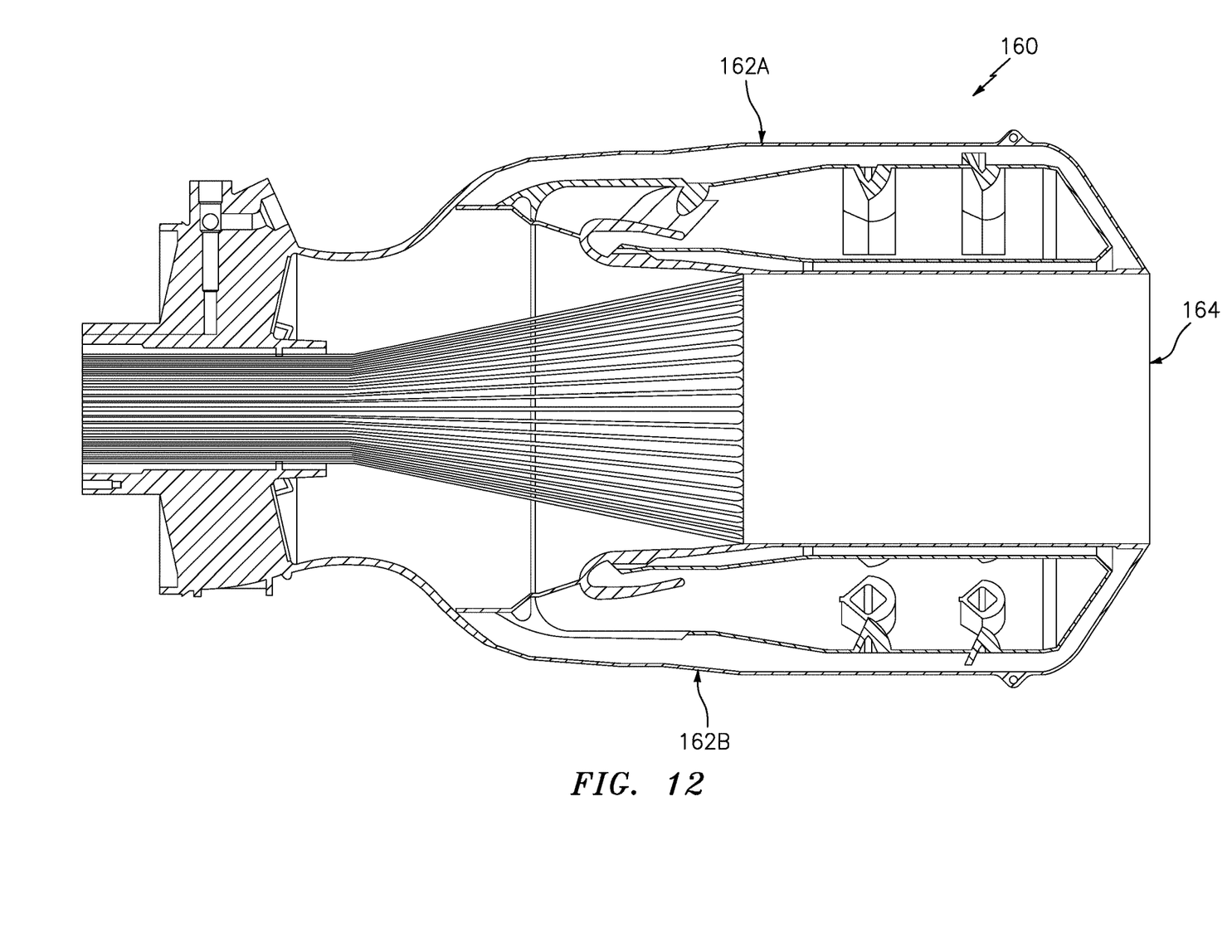
FIG. 12 is a side sectional illustration of a static engine structure preform.

In step 1102, a static engine structure preform 160 is formed. An example of the static engine structure preform 160 is shown in FIG. 12. This static engine structure preform 160 includes a first case segment preform 162A and a second case segment preform 162B. The static engine structure preform 160 may also include an exhaust duct structure preform 164 nested within the case segment preforms 162A and 162B.

Herein, the term preform may describe a body having at least a basic configuration (e.g., shape, size, features, etc.) of a part to be formed. For example, the first case segment preform 162A may generally have the same configuration as the first case segment 98A to be formed (see FIGS. 1-3). However, the first case segment preform 162A may include one or more build features, one or more unfinished surfaces, etc. The build features (e.g., webs, ribs, spares, etc.) may be included in order to support the preform during the formation step 1102. These build features, however, are removed (e.g., via machining) after the formation step 1102 to provide the first case segment 98A. In addition or alternatively, one or more surfaces, features (e.g., apertures, bosses, mounting features), etc. of the first case segment preform 162A may be machined (e.g., refined, smoothed, drilled, etc.) to provide the first case segment 98A. Generally speaking, no additional material will need to be added to the first case segment preform 162A to provide the first case segment 98A following the formation step 1102.

The static engine structure preform 160 may be completely formed within the build space 150 of the additive manufacturing apparatus 152. The entire static engine structure preform 160 including each of its components 162A, 162B and 164, for example, may be additively manufactured concurrently using a layer-by-layer method within the build space 150.

The first case segment preform 162A may be formed as a discrete body from the second case segment preform 162B. The first case segment preform 162A, for example, may be laterally separated from the second case segment preform 162B by a lateral gap. Alternatively, referring to FIGS. 13 to 15, the first case segment preform 162A may be formed integral with and thereby connected to the second case segment preform 162B. For example, referring to FIG. 13, the first case segment preform 162A may be indirectly connected to the second case segment preform 162B by one or more intermediate bridge structures 166. Each of these bridge structures 166 extends between and is connected (e.g., directly) to the first case segment preform 162A and the second case segment preform 162B at their sides 168A and 168B. One or more or each of the bridge structures 166 may have a V-shape, a U-shape, a chevron shape, etc. with a sharp chamfer or a radiused (e.g., eased, rounded) chamfer (e.g., see FIG. 14). Alternatively, referring to FIG. 15, the first case segment preform 162A may be connected directly to the second case segment preform 162B.

Referring again to FIG. 12, the exhaust duct structure preform 164 may be formed as a discrete body from one or each of the case segment preforms 162A and/or 162B. The present disclosure, however, is not limited to such a formation technique. For example, in other embodiments, the exhaust duct structure preform 164 may be connected to one or more of the case segment preforms 162A and/or 162B by one or more build supports (e.g., similar to the bridge structures 166 in FIG. 13 or 14).

While the components of the static engine structure preform 160 are described above as being formed concurrently within the build space 150, the present disclosure is not limited thereto. For example, in other embodiments, each of the preforms 162A, 162B, 164 (or select ones of the preforms) may be formed within the build space 150 separately from another one or more of the preforms 162A, 162B, 164. Furthermore, while the formation step 1102 is described above in relation to additively manufacturing, the present disclosure is not limited thereto. For example, in other embodiments, one or more or each of the preforms 162A, 162B and/or 164 may also or alternatively be formed using casting, machining and/or various other manufacturing techniques.

In step 1104, the static engine structure 34 and its components 64, 98A and 98B are provided. For example, the various preforms are removed from the build space 150 of the manufacturing system 146. In addition (before or after being removed from the build space 150), one or more of the following operations may be performed:

One or more or each of the preforms 162A, 162B and/or 164 may be de-powdered. For example, any remaining, un-solidified powder trapped with a respective preform 162A, 162B, 164 may be removed (e.g., evacuated) from that preform.

Figure 13:
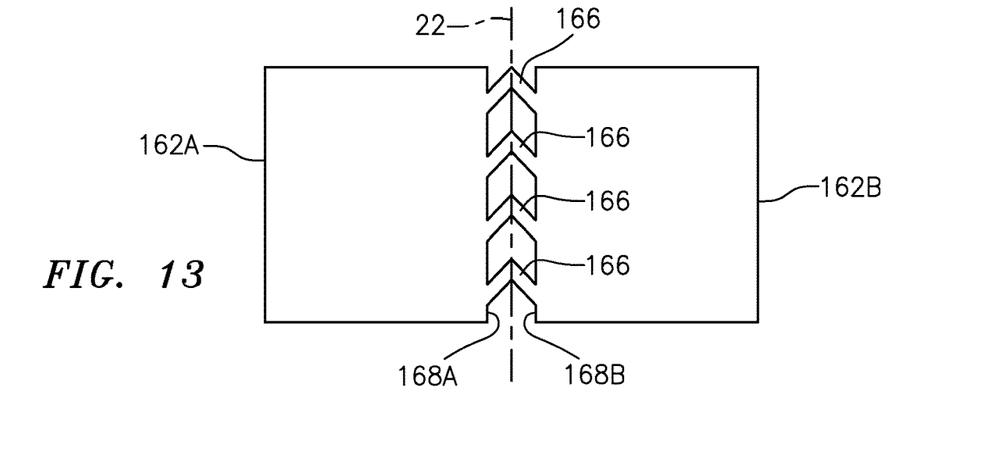
FIGS. 13-15 are schematic illustrations of connections between adjacent case segment preforms.
Figure 14:
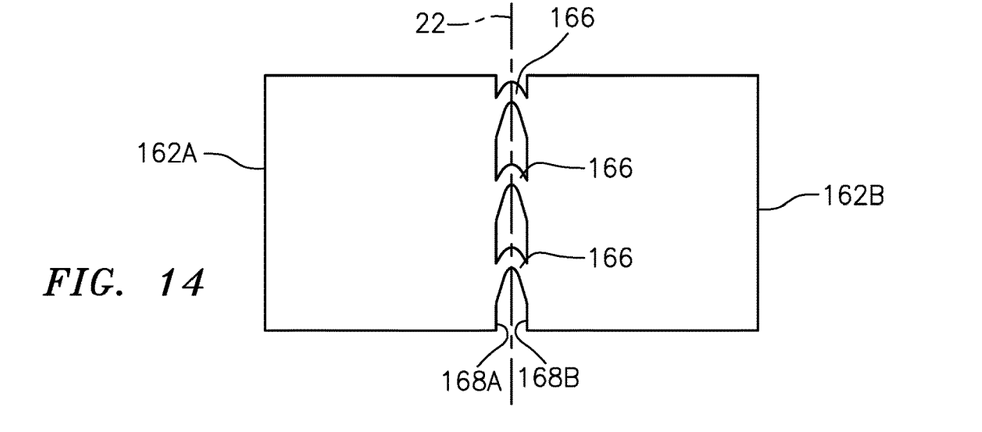
Figure 15:
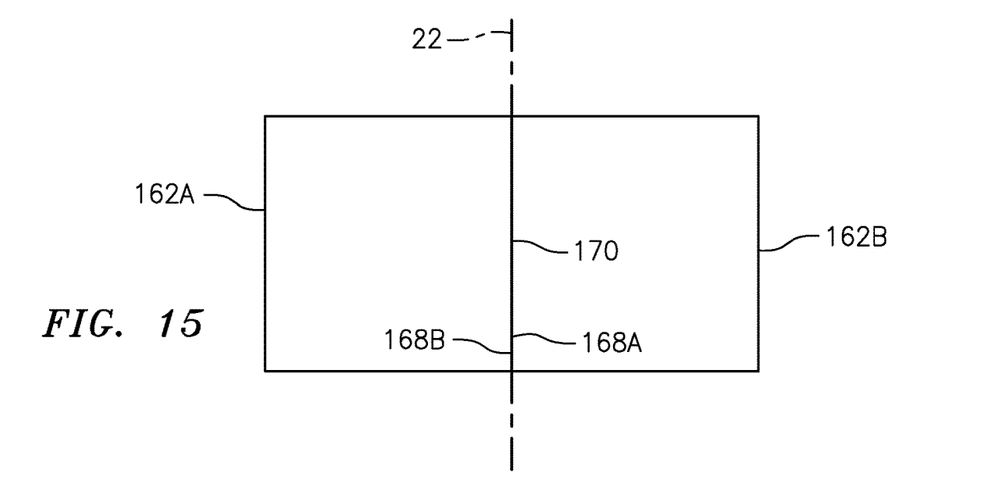

The preforms 162A and 162B may be separated from one another where, for example, the preforms 162A and 162B are connected together as shown in FIGS. 13 to 15. For example, the bridge structures 166 of FIG. 13, 14 may be cut off and/or ground down to separate the case segment preforms 162A and 162B. Alternatively, referring to FIG. 15, the combined case segment preform may be cut along a cut line 170 to provide discrete preform segments 162A and 162B.

Any build features may be removed from one or more or each of the preforms 162A, 162B and/or 164.

One or more surfaces, one or more features, etc. of one or more of the preforms 162A, 162B and/or 164 may be machined, surface treated, heat treated, etc.

One or more surfaces of one or more of the preforms 162A, 162B and/or 164 may be cleaned.

One or more surfaces of one or more of the preforms 162A, 162B and/or 164 may be coated.

By performing one or more of the above operations and/or other (e.g., finishing) operations, the preforms 162A, 162B and 164 may be turned into their respective static engine structure components 98A, 98B and 64.

In step 1106, the rotating assembly (e.g., 42, 44 and 46) and the bearings 48 are installed with one of the case segments 98 (e.g., the first case segment 98A).

In step 1108, the exhaust duct structure 64 is installed with the one of the case segments 98 (e.g., the first case segment 98A).

In step 1110, the remaining case segment 98 (e.g., the second case segment 98B) is mated with the other case segment 98 (e.g., the first case segment 98A) to provide the gas turbine engine 20.

The gas turbine engine 20 is described above as a single spool, radial-flow turbojet turbine engine for ease of description. The present disclosure, however, is not limited to such an exemplary gas turbine engine. The gas turbine engine 20, for example, may alternatively be configured as an axial flow gas turbine engine. The gas turbine engine 20 may be configured as a direct drive gas turbine engine. The gas turbine engine 20 may alternatively include a gear train that connects one or more rotors together such that the rotors rotate at different speeds. The gas turbine engine 20 may be configured with a single spool (e.g., see FIG. 1), two spools, or with more than two spools. The gas turbine engine 20 may be configured as a turbofan engine, a turbojet engine, a propfan engine, a pusher fan engine or any other type of turbine engine. In addition, while the gas turbine engine 20 is described above with an exemplary reverser flow annular combustor, the gas turbine engine 20 may also or alternatively include any other type/configuration of annular, tubular (e.g., CAN), axial flow and/or reverser flow combustor.

The present disclosure therefore is not limited to any particular types or configurations of turbine engines.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. A manufacturing method, comprising:
    forming a split case structure preform that includes a first case segment preform and a second case segment preform, wherein the first case segment preform is formed integral with the second case segment preform as a monolithic body;
    separating the first case segment preform from the second case segment preform to respectively provide a first case segment and a second case segment that is discrete from the first case segment, wherein the first case segment is configured to be arranged adjacent and mechanically fastened to the second case segment to form a split case structure for a gas turbine engine; and
    mechanically attaching the first case segment to the second case segment to form the split case structure, wherein the split case structure comprises at least one of:
        an annular combustion chamber of the gas turbine engine;
        a compressor wall configured to circumscribe and house a bladed compressor rotor of the gas turbine engine; or
        a turbine wall configured to circumscribe and house a bladed turbine rotor of the gas turbine engine.

2. The manufacturing method of claim 1, wherein the first case segment preform is indirectly connected to the second case segment preform through one or more intermediate bridge structures.

3. The manufacturing method of claim 1, wherein the first case segment preform is directly connected to the second case segment preform.

4. The manufacturing method of claim 1, wherein the forming of the split case structure preform includes additively manufacturing the split case structure preform within a build space of an additive manufacturing system.

5. The manufacturing method of claim 1, wherein
    the split case structure includes a first wall, a second wall, the first case segment and the second case segment;
    the first wall extends axially along and circumferentially about an axial centerline;
    the second wall extends axially along and circumferentially about the axial centerline, and the second wall is radially outboard of and axially overlaps the first wall;
    the first case segment is configured to form a first portion of the first wall and a first portion of the second wall; and
    the second case segment is configured to form a second portion of the first wall and a second portion of the second wall, and the second case segment is circumferentially adjacent and attached to the first case segment at a joint.

6. The manufacturing method of claim 5, wherein one of the first wall and the second wall comprises a diffuser wall.

7. The manufacturing method of claim 5, wherein one of the first wall and the second wall comprises a combustor wall.

8. The manufacturing method of claim 5, wherein one of the first wall and the second wall comprises the compressor wall.

9. The manufacturing method of claim 5, wherein one of the first wall and the second wall comprises the turbine wall.

10. The manufacturing method of claim 5, wherein the first case segment includes a support member that extends between and connects the first wall to the second wall.

11. The manufacturing method of claim 5, wherein
    the first case segment includes a channel; and
    the second case segment includes a seal element inserted within the channel to seal an interface between the first case segment and the second case segment at the joint.

12. The manufacturing method of claim 5, wherein the split case structure further includes a seal element arranged between and engaged with the first case segment and the second case segment to seal an interface between the first case segment and the second case segment at the joint.

13. The manufacturing method of claim 5, wherein the first case segment includes a crush seal element configured to engage the second case segment to seal an interface between the first case segment and the second case segment at the joint.

14. The manufacturing method of claim 1, wherein
    the first case segment is configured as a monolithic body; and/or
    the second case segment is configured as a monolithic body.

15. The manufacturing method of claim 1, wherein
    the split case structure forms a compressor section inlet and a turbine section outlet;
    the first case segment extends axially along an axial centerline from the compressor section inlet to the turbine section outlet; and
    the second case segment extends axially along the axial centerline from the compressor section inlet to the turbine section outlet.

16. The manufacturing method of claim 1, wherein
    the split case structure includes the compressor wall, a combustor wall, the turbine wall, the first case segment and the second case segment;
    the first case segment is configured to form a first portion of the compressor wall, a first portion of the combustor wall and a first portion of the turbine wall; and
    the second case segment is configured to form a second portion of the compressor wall, a second portion of the combustor wall and a second portion of the turbine wall.

17. The manufacturing method of claim 16, wherein at least one of
    the first case segment forms a respective portion of an inlet to a compressor section of the gas turbine engine; or
    the first case segment forms a respective portion of an outlet from a turbine section of the gas turbine engine.

18. The manufacturing method of claim 16, wherein
    the split case structure further includes a first wall and a second wall radially outboard of and axially overlapping the first wall;
    the first case segment is configured to form a first portion of the first wall and a first portion of the second wall; and the second case segment is configured to form a second portion of the first wall and a second portion of the second wall.

19. The manufacturing method of claim 1, further comprising arranging the second case segment circumferentially adjacent and attaching the second case segment to the first case segment at an axially extending joint.

* * * * *